Patented Oct. 20, 1925.

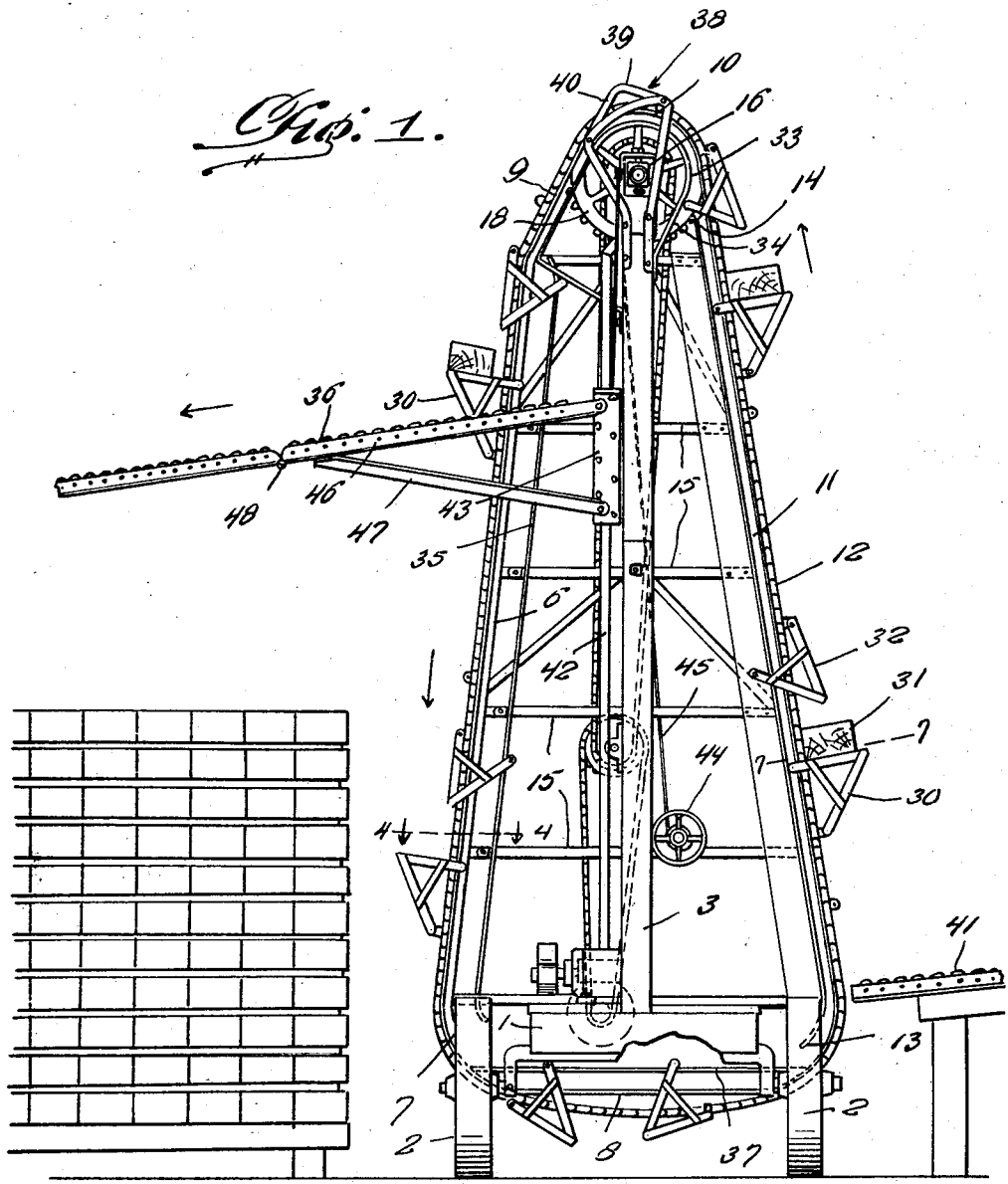

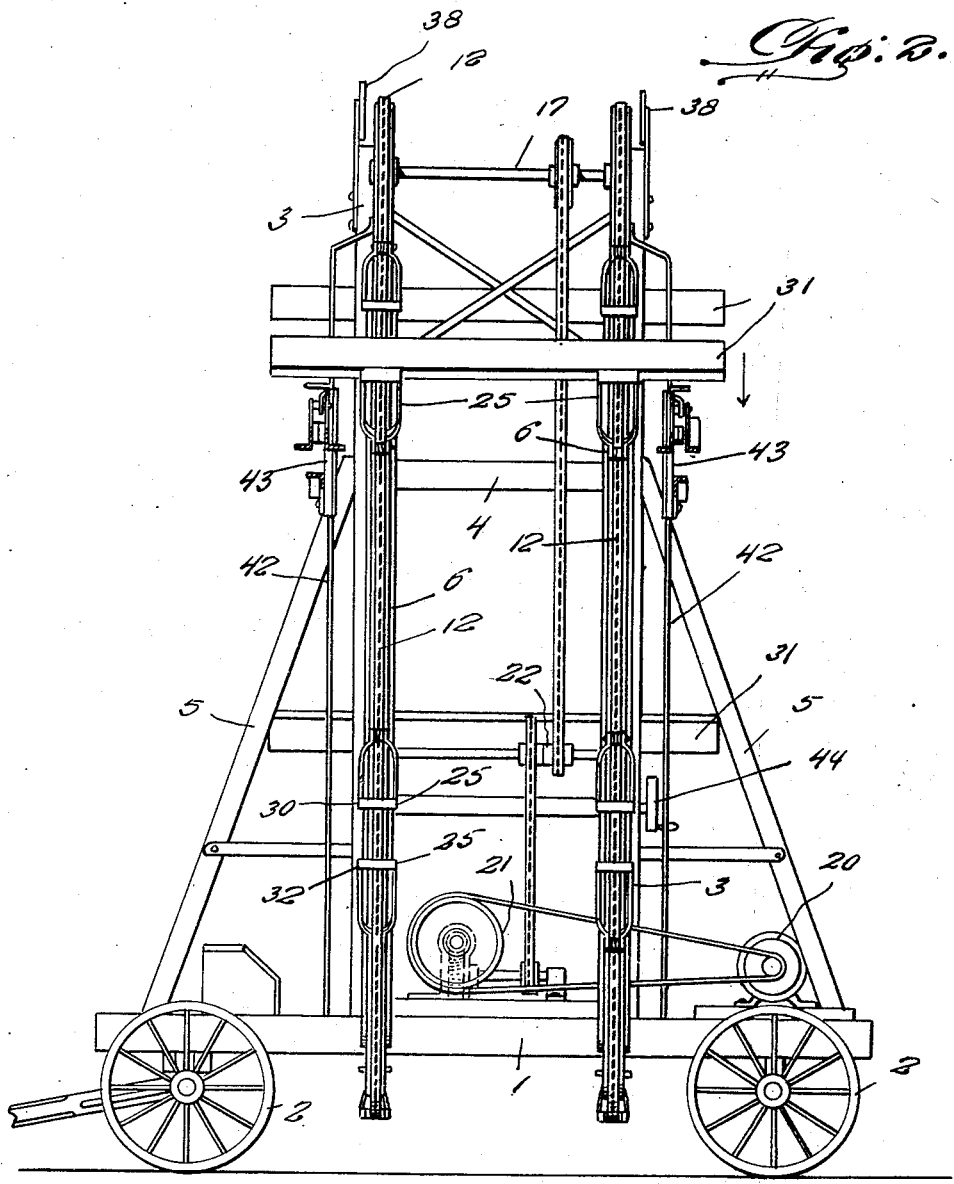

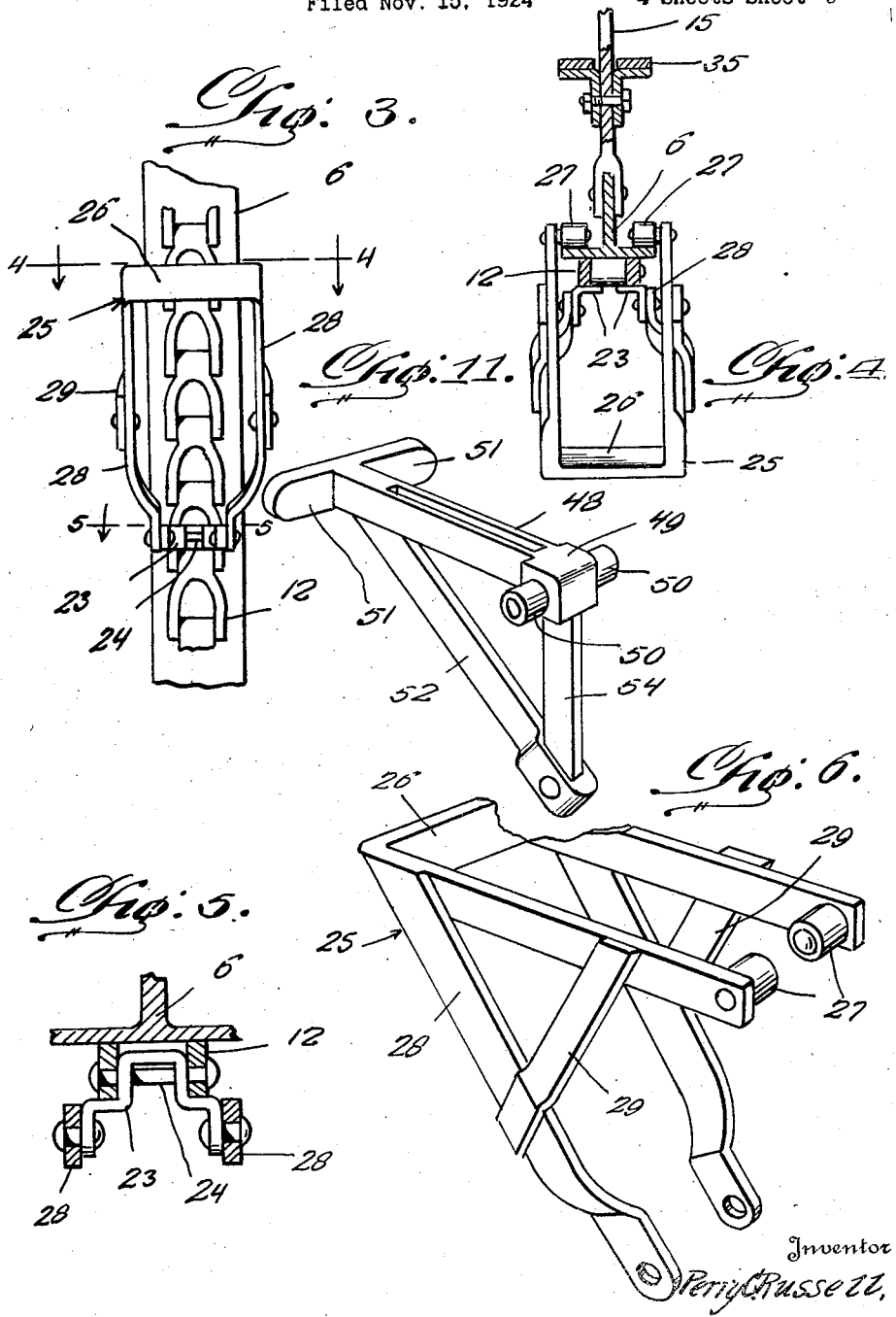

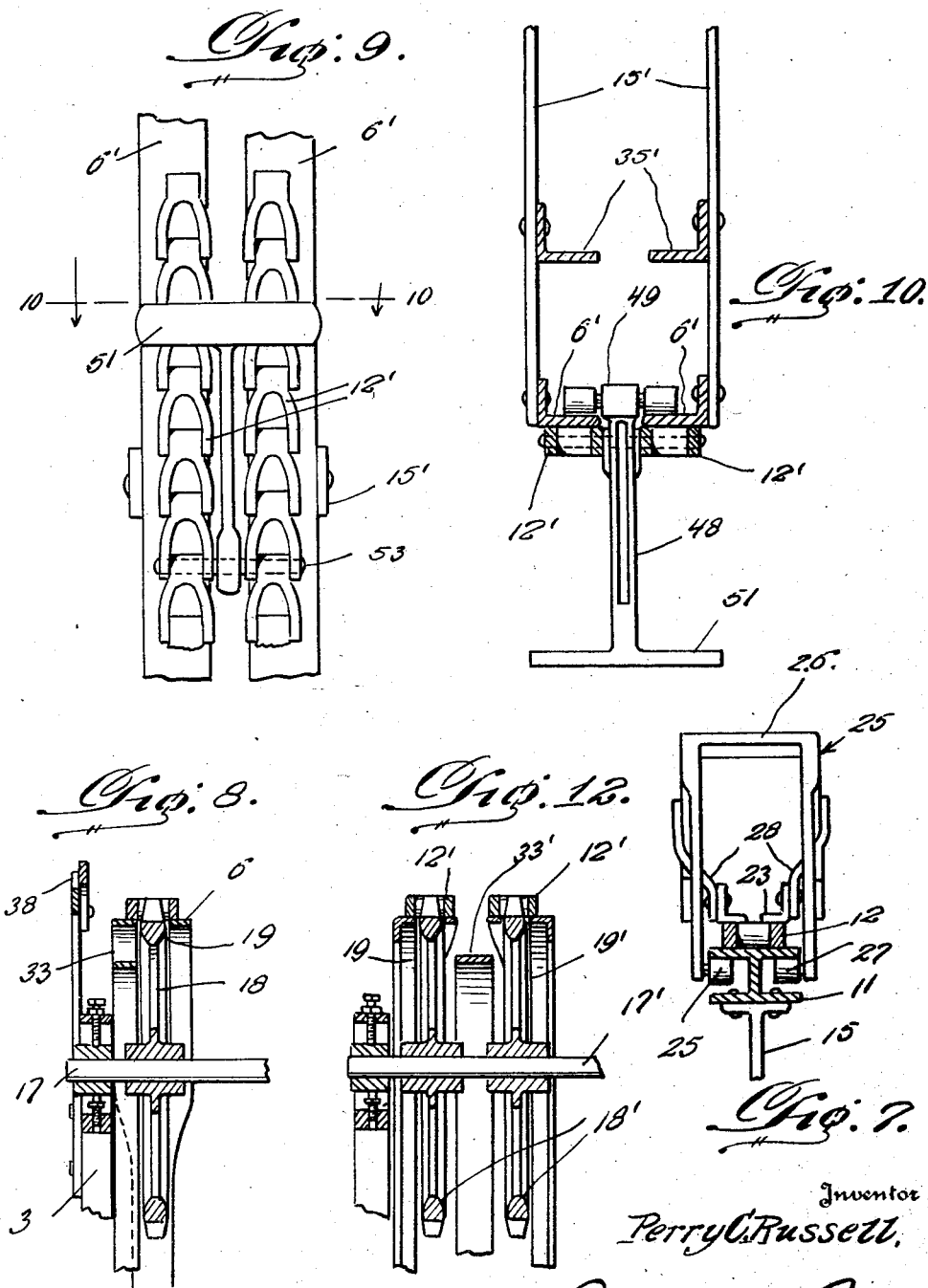

1,557,776

UNITED STATES PATENT OFFICE.

PERRY C. RUSSELL, OF SOMERS, MONTANA.

ELEVATING AND LOWERING CONVEYER.

Application filed November 15, 1924. Serial No. 750,098.

*To all whom it may concern:*

Be it known that I, PERRY C. RUSSELL, a citizen of the United States, residing at Somers, in the county of Flathead and State of Montana, have invented certain new and useful Improvements in Elevating and Lowering Conveyers, of which the following is a specification.

This invention relates to conveyers, and more particularly elevating and lowering conveyers adapted for use in loading or piling lumber, ties, logs, and numerous other articles of similar character.

This invention comprehends the provision of a conveyer structure having upwardly and downwardly movable plates in a conveyer means provided with article carrying elements arranged in cooperating pairs for conveying articles upwardly over the top of the conveyer and downwardly on the opposite side thereof, the conveyer operating to receive articles at one side and discharge them at the opposite side. The invention comprehends the provision of a conveyer structure which may be used for elevating articles from a lower to a higher level or may be used solely for lowering articles from a higher to a lower level. In the first case, the conveyer provides independent means for raising the articles to the top of the conveyer structure and lowering them by separate means from the raising means on the opposite side of the conveyer for discharge at a higher level than that from which they were raised. In the lowering of articles from higher levels to lower levels, it is preferably desired to only use a single means for supporting the articles, which receive them at the higher level and discharge them at the lower level.

The invention further includes the provision of special article supporting means and controlling means therefor, to govern the operation of said article supporting means and control the movement and position of the article supported by said means, during the conveying thereof on said conveyer.

The invention comprehends other features residing in the construction and arrangement of the parts, for special cooperation, which are more particularly pointed out in the following detailed description and claims, directed to a preferred form of the invention, it being understood, however, that the invention may be applied for use in connection with the conveying of various different forms of articles, from those shown and described, without departing from the spirit and scope of the invention, as described and claimed.

In the drawings forming a part of this application,

Figure 1 is an end elevational view of the improved conveyer, forming the subject matter of this invention, showing it in associated relation with gravity conveyers, and adapted for use in piling ties and lumber.

Figure 2 is a side elevation of the conveyer, shown in Figure 1.

Figure 3 is an enlarged detail elevational view, taken from the side of the machine, showing one of said article supporting elements, in associated relation with the conveyer chain and guide rail.

Figure 4 is a sectional view, taken on the line 4—4 of Figure 3.

Figure 5 is a detail sectional view, taken on the line 5—5 of Figure 3.

Figure 6 is a detail enlarged perspective view of one of the article supporting elements shown in Figures 1 and 2.

Figure 7 is a sectional view, taken on the line 7—7 of Figure 1, and showing on an enlarged scale, the cooperative relation between an article supporting bracket, the conveyer chain, and a guide rail.

Figure 8 is a vertical sectional view, through one end portion of the upper end of the conveyer frame, showing the drive sprocket for one of the chains, the drive rail and associated parts.

Figure 9 is a view similar to Figure 3, showing a modified form of construction, wherein two chains and two guide rails are used for supporting and operating an article carrying element.

Figure 10 is a sectional view, taken on the line 10—10 of Figure 9.

Figure 11 is an enlarged detail perspective view of the article supporting bracket, used with a double chain and guide rail.

Figure 12 is a view similar to Figure 8, showing the construction of the guide rails at the upper end of the frame, and the sprocket for driving a double chain.

The improved conveyer, forming the subject matter of this invention, includes a base frame or platform 1, carried by the supporting wheels 2, in order that the conveyer may be moved from place to place in a convenient manner, for various operations. A pair of uprights 3 are mounted in vertical spaced parallel relation, longitudinally of the base 1, and are secured in this spaced relation, by suitable cross members 4. Inclined brace members 5 extend from the end portions of the platform 1 upwardly, and are attached to the upper portions of the uprights 3 for reinforcing the mounting of the uprights on the base, and insuring rigidity of the conveyer frame structure.

A pair of guide tracks 6 are mounted on one side of the base 1 between the wheels in spaced parallel relation and extend upwardly and incline inwardly toward the upper end of the upright 3; as clearly shown in Figure 1, the lower end of the guide track 6 being curved under the platform 1, as indicated at 7, and attached to a bottom horizontal guide track 8, extending under the bottom of the platform. The upper ends of the guide track 6 are provided with end portions 9, which extend in angular relation to the main portion of the guide track, and terminate in arcuate portions 10, above the uprights 3. These guide tracks 6, throughout the major portion of their lengths are of T-section, as more clearly illustrated in Figure 4. A pair of guide tracks 11 are mounted on the opposite sides of the platform, from the guide track 6, and extend upwardly, in inclined spaced parallel relation, in the same vertical plane as the guide tracks 6, the upper end being curved and joined to the ends of the guide track 6, at the upper end of the frame, above the uprights 3, so as to form a pair of continuous guide track frames arranged on the platform, forming a support and guide for a pair of conveyer chains 12. The lower ends of the guide tracks 11 are curved under the platform 1, and terminate in connection with the horizontal bottom track portion 8. These guide tracks 11, throughout the major portion of their length above the platform are of H-section, as more clearly shown in Figure 7, while the lower end has the inner flange terminating at 13, for a purpose which will presently appear. The upper end of the inner flange of the guide track 11 terminates at 14, while the outer flange extends upwardly, in curved relation, for attachment to the ends of the guide track 6. A plurality of bar members 15 are connected with the guide tracks 6 and 11, at spaced intervals, in order to secure said guide tracks and guide track frames formed thereby, in a predetermined relation, on the base 1, the bars being connected to the uprights 3; in order to form the main frame of the machine. Bearings, indicated at 16, are mounted on the upper ends of the uprights 3, and rotatably mount a sprocket shaft 17, having sprocket wheels 18 thereon, the teeth of which are adapted to project through the slotted portions 19 of the guide track frame, so that the teeth will engage in the links of the chains 12. A suitable source of power is indicated at 20, mounted on the base 1, for driving the sprocket shaft 17 through suitable reduction gearing, indicated at 21 and 22 respectively, suitable endless drive chain connections being made between the source of power, the reduction gearing unit, and the driven sprocket on the shaft 17. The conveyer chain members 12 are formed with a plurality of substantially flat pivotally connected links of any well known and desired character, which are adapted to ride on the guide track frame, formed by the guide tracks 6 and 11. The links of this chain are provided, at predetermined points, with bracket members 23, secured to the links by suitable bolt or rivet members 24, the free ends of the bracket members extending beyond the outer surface of the conveyer member 12, to provide ears on which are pivotally mounted article supporting elements 25.

These article supporting elements include U-shaped members 26, which project substantially at right angles from the chains 12, in operative position, for forming the article engaging portions of the element, the free ends of this member 26 extending at opposite sides of the chains 12 and also the guide track frame, for receiving rollers 27 mounted for rotation on the ends of the arms and at right angles to said arm, which are adapted for engagement with the inner faces of the outer flanges of the guide track frame, for retaining the article supporting elements, in operative position, during their movement with the chain around said frame. A pair of arms are formed with or otherwise connected to the U-shaped member 26, adjacent the bridge portion thereof, said arms being indicated at 28, and inclining at an acute angle from the legs of the U-shaped member 26, having the free ends bent inwardly toward each other, said free ends being pivotally connected to the ears of the bracket member 23, for pivotally attaching the article supporting element to the conveyer members 12. Braces 29 connect the end portions of the legs of the U-shaped member and the arms 28 to insure the rigidity of the article carrying elements.

These article supporting members, it will be noted, have a limited pivotal movement, relative to the conveyer chain members 12, on the pivotal connections of said members to the chain member, which is determined by the rollers 27 in one direction, and the bridge portion of the member 26 in the other direction. In the one position, the article supporting elements are operative, for supporting articles to be conveyed, while in the other position, the elements are inoperative, for purposes which will presently appear. In the form of the invention illustrated, a plurality of these article supporting elements, designated at 30, are mounted on the conveyer members 12, in such a manner that they are extended into article carrying position, with the rollers 27 engaging the inner flanges of the guide track frame, for conveying articles upwardly along one side of the frame, being that side formed by the guide tracks 11. As the chain conveyer members 12 are moved in the direction of the arrows around the guide track frame, these article supporting elements 30 will be projected by gravity outwardly on their pivots on the chain conveyer members as they move under the platform 1, and around, over the lower end of the guide tracks 11, so that the rollers 27 will ride between the outer and inner flanges of the track bars 11, and be effectively retained therein, in projected position, for receiving and conveying the ties 31 upwardly to the top portion of the frame. A plurality of article supporting elements 25 are pivotally mounted on the conveyer chain members, so as to be operative in a direction opposite to the elements designated at 30, these last plurality of article carrying elements being designated at 32, and corresponding in number to the elements designated at 30, and forming cooperating elements therewith. These article supporting elements, designated 32, are arranged on the chain at a distance from the elements designated 30, equal to slightly more than the width of the tie or other article to be conveyed by the conveyer. These article supporting elements designated 32 remain inoperative, in the upward movement thereof along the guide tracks 11, by gravity, in a manner as illustrated in Figure 1 of the drawing, so that they will easily pass by ties, or other articles to be conveyed, which are being fed to the conveyer for support on the article supporting elements designated 30. At the upper end of the track guide frames are projecting guides 33, mounted on the uprights 3, which are provided with an inclined portion 34, for projecting the article supporting elements 32 into operative position, as they pass over the top portion of the frame, and the sprocket wheels 18 and hold them in operative position, during a portion of the downward movement along the inclined upper ends of the guide track 6, indicated at 9. These projecting guides 33 also hold the article supporting elements 30, in operative position during their movement over the top portion of the guide frame, so that the ties 31 may be transferred from supporting relation on the elements designated 30 into supporting relation on the elements designated 32. The supporting elements, designated 30 will be retained in operative position by gravity, in passing downwardly along the guide tracks 6, as clearly illustrated in Figure 1 of the drawings, while the cooperating supporting elements, designated 32 will move into an inoperative position with the bridge portion of the member 26 lying adjacent the chain and will be held therein, by the guide bars 35 mounted on the arms 15, in spaced parallel relation, to the guide tracks 6, so that in the discharge of a tie from the article supporting elements designated 30, the supporting elements designated 32 will not engage or interfere with the discharging of the ties to a roller conveyer 36, for conveying the ties away from the frame. Bottom guide bars are indicated at 37, and are secured to the flanges at the lower ends of the guide tracks 6 and 11, for guiding the supporting elements under the platform, and preventing these elements from dropping below the chain a distance sufficient to engage the ground or other obstacles under the platform.

Article transfer members, are indicated at 38, which are mounted upon the upper ends of the uprights 3, and serve to control the transfer of the articles supported on the carrying elements designated 30, to the carrying elements designated 32, as they are passed over the upper end of the conveyer frame. These transfer members include upwardly inclined portions 39, for receiving the articles conveyed, and for raising the same above the chain conveyer members as they pass over the sprocket wheel 18, while a portion 40 extends substantially at right angles to the portion 39, for positioning the articles on the carrier elements, designated 32, in a predetermined relation, so as to slightly space them from the chain conveyers 12. These transfer members prevent the transfer of the weight of the articles carried by the conveyer, in an irregular manner, and serve to control the change of support at a predetermined point and in a uniform manner, so that undue strain will not be applied to the conveyer chain members 12. The angular arrangement of the guide tracks 6, as indicated at 9, has the important feature in connection with these transfer members of assisting to prevent the accidental discharge of the articles being conveyed from the carrier elements 25.

A delivery conveyer is indicated at 41, by which articles to be elevated and piled are delivered to the conveyer frame and to the article supporting element movable thereon, while the conveyer 36 forms a discharge conveyer to direct the articles raised on the conveyer frame by the article supporting elements, to a position desired in piling the articles. For this purpose, a pair of upright guides are provided, on the platform, as indicated at 42, which are connected at their upper ends to the uprights 3 and are arranged in spaced parallel relation and at opposite ends of the uprights 3 in a manner as clearly shown in Figure 2. Slide members 43 are suitably slidably mounted on the upright guides 42 and are adapted to be adjusted in their positions thereon, through the operation of manually controlled raising and lowering means indicated at 44, for controlling a cable 45, extending over suitable pulleys on the upper ends of the uprights 3 and connected to the slide members 43. A roller conveyer section 46 is connected to the slide member 43, as illustrated at Figure 1, and held in fixed position thereon, by the arms 47, while the remaining portion of the conveyer 36 is hingedly connected thereto, as indicated at 48, so that the same may be positioned to discharge the ties in a desired position in the pile.

When it is desired to raise substantially heavy weights, by means of a conveyer of this character, it is necessary to increase the strength of this conveyer for this purpose. With this end in view, it has been found desirable, instead of increasing the dimensions of the parts, to duplicate the number of the parts, with slight changes therein, in order to carry heavier weights. A construction of this character would be similar in all respects to the construction shown in Figure 1, but for the purpose of adding additional supporting strength, the frame of the conveyer may be provided with pairs of associated chain guide tracks in the place of single guide tracks. Such a construction is illustrated in Figures 9, and 10, where a pair of track bars, of L-section, indicated at 6', are adapted to form pairs of adjacent spaced supporting tracks for a pair of co-operating conveyer chains 12'; pairs of bar members 13' attaching these guide tracks to the uprights 3 in place of single bars 15, as illustrated in Figure 1. The construction and arrangement of the guide frame throughout are identical in all respects to the structure shown in Figures 1 and 2, with the exception that the guide tracks and conveyer chains are double in number and a slightly different form of carrier element is used. At the upper ends of the guide frame, the tracks supporting the chains are slotted, as indicated at 19', similar to the slots 19, so that the pair of sprocket wheels 18' arranged in spaced relation on the shaft 17' may operate the respective adjacent chains 12'.

The article supporting brackets formed for use in this construction are shown more clearly in Figure 11, and consist of a slotted supporting arm 48, having a head 49, which is adapted to project between the pairs of track guides 6' and which carries rollers 50 at opposite sides thereof, for engagement with the inner faces of the flanges of these tracks, for operation in a similar manner to the article supporting elements 25. The other end of the arm carries laterally extending projections 51, which are adapted to engage the outer surfaces of the conveyer chains 12' to prevent the arm swinging inwardly between the guide tracks, so as to limit the inoperative position thereof, and pivotal movement relative to the chain 12'. An arm 52 extends in angular relation from the outer end of the arm 48, and at its free end is provided with an opening for receiving a pivot pin 53 extending through the link connections of a pair of chains 12' for pivotally mounting this article carrying element on the pair of chains, a connecting brace member 54 connecting the free end of the arm 52 with the head 49, so as to form a substantially rigid supporting element. In this reinforced construction, a pair of guide bars are positioned inwardly of the pair of guide tracks 6', as indicated at 35', and correspond in all respects to the guide bars 35', in the operation of the article carrying elements. The projecting guides at the upper ends of the uprights used in connection with this construction are indicated at 33', and are positioned between the sprockets 18' instead of at the outer side thereof, as in the construction shown in Figure 1, while the article controlling members are identical in construction and positon with the one shown in Figure 1.

It is, of course, to be understood that, as shown in Figures 1 and 2, two pairs of guide track frames are illustrated, mounting two endless conveyer chain members 12 for movement over said frame, so that the sprocket wheels are rotated in unison, for producing an even and uniform movement of each of these endless conveyer members and that the article supporting elements are positioned in corresponding relation on each member 12, so that the corresponding article supporting elements of each member are positioned in corresponding positions as they move around the frame, for cooperation in conveying and discharging articles conveyed thereby.

The machine, as illustrated in the drawing, is constructed more particularly for use as a tie elevating and piling machine. In this use, the ties are delivered to the machine by the conveyer 41 by gravity, and in the movement of the chain around the frame, in the direction of the arrows, the supporting elements designated 32 will be in inoperative position as they move past the end of the conveyer 41, so that they will not engage or operate to support the ties delivered to the machine, but which will be engaged and supported by the article supporting elements designated 30, as they move upwardly past the end of the conveyer 41, in a manner as shown in Figure 1. The ties will be raised by this machine upwardly along the guide tracks 11, to the top portion of the frame, as illustrated in Figure 1, where they will be moved onto the controlling members 38, and pushed over said controlling members by the supporting elements designated 30, until they reach the end of the portion 39, from which they will be discharged onto the portion 40 of these storage members and be positioned in slightly spaced relation on the article supporting elements designated 32, which have been previously moved into operative position, as they move over the top of the frame, and which will serve to support the ties, during the lowering movement thereof, until the ties rest on the discharge conveyer 36, whereafter they will move by gravity downwardly on the conveyer 36 to a desired point. It will be noted in this connection that the guide bars 35 retain the article supporting elements designated 30, in inoperative position, in the downward movement of the flight of the chain conveyer as illustrated in Figure 1 of the drawing, that they will not interfere in any way with the movement of the chain or the discharge of the ties from the machine. It is also to be noted that the particular inclination of the upper end portion of the guide track 6, as indicated at 9, is of such a character that ties are prevented from accidentally turning over in the transfer from one supporting element to the other, and being accidentally discharged from the machine. The inclination of this portion 9 of the guide track 8 may be changed to suit the convenience of the articles being conveyed by the machine, in order to prevent accidental discharge of said article. The relative spacing of the carrier elements designated 30 and 32 may be also changed on the conveyer members 12, in order to adapt them for cooperation to elevate and convey articles of a predetermined contour, and size.

It is also to be understood that if desired the conveying machine may be used either for elevating purposes only or for lowering, and that in such cases the conveyer chain may be provided with article supporting elements operable in one direction only, instead of the pairs of elements operable in opposite directions, as in the form illustrated, so that the conveyer will merely elevate in one case or lower in another, it being unnecessary to show a specific illustration of such construction, as it would merely consist in the removal of one of the sets of carrier elements designated 30 or 32, and a re-arrangement of the charging and discharging conveyers relative to the frame of the machine. The invention therefore essentially includes the provision of travelling conveyer members travelling in two directions and carrying movable article supporting elements, which are operable in one direction, and inoperative in the opposite direction, so that articles may be suitably placed on the conveyers and transferred from movement in one direction to movement in the other direction, for either elevating or lowering the point of discharge of the articles with respect to the point of charging thereof, in such a manner that the supporting elements will not interfere with the charge or discharge of said elements from the machine.

What is claimed is:

1. A conveyer comprising a frame, endless conveyer members movable on said frame in a substantially vertical plane having upwardly movable flights and downwardly movable flights, means movably mounted on said endless members movable into operative position on one of said flights for conveying purposes, and movable to inoperative position on the other flight, said movable means guiding the conveyer members on the frame.

2. A conveyer comprising a frame having guide tracks arranged in vertical planes, endless conveyer members movable on said tracks having an upwardly movable flight and a downwardly movable flight, and a plurality of cooperating pairs of pivoted elements mounted on said conveyer members, one element of each pair being operable in the upward flight and inoperable in the downward flight, the other element of each pair being inoperative in the upward flight and operative in the downward flight, both said elements being operative in passing over the top of the frame and cooperating in conveying articles from one side to the other of the frame over the top portion thereof.

3. A conveyer comprising a frame having guide tracks arranged in vertical planes, endless conveyer members movable on said tracks having an upwardly movable flight and a downwardly movable flight, and a plurality of cooperating pairs of pivoted elements mounted on said conveyer members and one element of each pair being operable in the upward flight and inoperable in the downward flight, the other element of each pair being inoperative in the upward flight and operative in the downward flight, said elements cooperating in conveying articles from one side to the other of the frame over the top portion thereof, and means for preventing accidental discharge of the article in passing over the top of the frame from one element to the other element of a pair.

4. A conveyer comprising a frame having endless guide tracks arranged in the vertical plane, endless conveyer members movable on said tracks having an upwardly movable flight and a downwardly movable flight, pairs of cooperating elements pivotally mounted on the conveyer members, each element of a pair being operable in the movement along one flight of the conveyer member and inoperable along the other flight, and guiding and operating means for said elements adapted to retain them in operative position or in an inoperative position in their movement around said frame.

5. A conveyer comprising a frame having endless guide tracks arranged in the vertical plane, endless conveyer members movable on said tracks having an upwardly movable flight and a downwardly movable flight, pairs of cooperating elements pivotally mounted on the conveyer members, each element of a pair being operable in the movement along one flight of the conveyer member and inoperable along the other flight, guiding and operating means for said elements adapted to retain them in operative position or in an inoperative position in their movement around said frame, and means for preventing accidental discharge of the article passing over the top of the frame from one element to the other of a pair, and means for controlling the changing of an article from support on one of said elements to support on another of said elements of a pair.

6. A conveyer comprising a frame having endless tracks arranged in a vertical plane, endless conveyer members movable on said tracks, said conveyer members being movable upwardly on one portion of the track, and downwardly on another portion thereof, and cooperating pairs of carrier elements having independent pivotal mountings on said conveyer members for independent movement into operative and inoperative positions, and means for operating said carrier elements to operative and inoperative positions.

7. A conveyer comprising a frame having endless tracks arranged in a vertical plane, endless conveyer members movable on said tracks, said conveyer members being movable upwardly on one portion of the track, and downwardly on another portion thereof, and cooperating pairs of carrier elements having independent pivotal mountings on said conveyer members for independent movement into operative and inoperative positions, and means for operating said carrier elements to operative and inoperative positions, said carrier elements being formed for cooperation with the endless track for guiding the conveyer members thereon.

8. A conveyer comprising a frame having endless tracks arranged in a vertical plane, endless conveyer members movable on said track, said conveyer members being movable upwardly on one portion of the track and downwardly on another portion thereof, cooperating pairs of carrier elements having independent pivotal mountings on said conveyer members for independent movement into operative and inoperative positions, and means mounted on said frame for operating said carrier elements independently and in a predetermined relation in the movement thereof with the endless conveyer members on said track.

9. A conveyer comprising a frame having endless tracks arranged in a vertical plane, endless conveyer members movable on said tracks, said conveyer members being movable upwardly on one portion of the track and downwardly on another portion thereof, cooperating pairs of carrier elements having independent pivotal mounting on said conveyer members for independent movement into operative and inoperative positions, said carrier elements being formed for cooperation with the frame to guide the endless conveyer members on said tracks, operating structure on said frame for the carrier elements said cooperating portions of the carrier elements being also formed for cooperation with the operating structure on said frame, for retaining predetermined of said carrier elements in operative position and the remaining carrier elements in inoperative position, in movement over predetermined portions of said endless tracks.

10. A conveyer comprising a frame having endless tracks arranged in a vertical plane, endless conveyer members movable on said tracks, said conveyer members being movable upwardly on one portion of the track and downwardly on another portion thereof, cooperating pairs of carrier elements having independent pivotal mounting on said conveyer members for independent movement into operative and inoperative positions, said carrier elements being formed for cooperation with the frame to guide the endless conveyer members on said tracks, operating structure on said frame for the carrier elements, said cooperating portions of the carrier elements being also formed for cooperation with the operating structure on said frame, for retaining predetermined of said carrier elements in operative position and the remaining carrier elements in inoperative position, in movement over predetermined portions of said endless track, and means at the upper end of the frame between the upwardly and downwardly movable portions of said endless conveyer member for positively projecting both carrier elements of a pair into operative position, whereby articles carried by one set of carrier elements may be transferred to the cooperating carrier elements in the movement of said articles over the top portion of the frame.

11. A conveyer comprising a frame having endless tracks arranged in a vertical plane, endless conveyer members movable on said tracks, said conveyer members being movable upwardly on one portion of the track and downwardly on another portion thereof, cooperating pairs of carrier elements having independent pivotal mountings on said conveyer members for independent movement into operative and inoperative positions, said carrier elements being formed with extensions cooperating with the frame to guide said endless conveyer members thereon, guide rollers carried by the extensions on said carrier elements for cooperation with the endless tracks, and guiding tracks adapted for cooperation with said guide rollers for effecting the operation of said carrier elements to operative and inoperative positions in a predetermined manner, in travel over the frame.

12. A conveyer comprising a frame having endless tracks arranged in a vertical plane, endless conveyer members movable on said tracks, said conveyer members being movable upwardly on one portion of the tracks and downwardly on another portion thereof, and cooperating pairs of carrier elements having independent pivotal mountings on said conveyer members for independent movement into operative and inoperative positions, said carrier elements each comprising supporting arms having one end portion extending beyond the endless track, guide rollers mounted on said end portions for engagement with said endless tracks, to guide the supporting arms, the opposite ends of said supporting arms having an extension forming an acute angle therewith, the free end of said extension being pivotally connected to the endless conveyer members to form the pivotal support of the article carrying elements.

In testimony whereof I affix my signature.

PERRY C. RUSSELL.